3,284,520
OLIGOMERIZATION
Ernest A. Zuech, Bartlesville, Okla., assignor to Phillips Petroleum Company, a corporation of Delaware
No Drawing. Filed June 24, 1963, Ser. No. 290,158
1 Claim. (Cl. 260—666)

This invention relates to a method for dimerization and trimerization of conjugated dienes. In one aspect this invention relates to a novel catalyst system for the oligomerization of conjugated dienes. In another aspect this invention relates to a novel method for the oligomerization of conjugated dienes in the presence of a novel catalyst system. In another aspect this invention relates to a method of and catalyst system for forming a preponderance of either dimer or trimer of the conjugated dienes.

Various processes have been developed for the dimerization and trimerization of conjugated dienes. For example, when 1,3-butadiene is contacted with a catalyst system comprising an organoaluminum such as triethylaluminum and a reducible metal halide such as titanium tetrachloride, 1,5,9-cyclododecatriene can be obtained. Other processes have been developed for converting butadiene to dimers, both vinylcyclohexene and 1,5-cyclooctadiene. Since these cyclic dimers and trimers are useful as intermediates for the production of a large number of compounds, processes leading to the production of these dimers and trimers in large yields would be very valuable.

Accordingly, it is an object of this invention to provide a process for the oligomerization of conjugated dienes.

Another object of this invention is to provide a new catalyst system for the production of cyclic dimers and trimers of conjugated dienes.

Another object of the invention is to provide a novel process and catalyst system whereby preferential formation of either the dimer or trimer compound is obtained.

Other objects, aspects and the several advantages of the invention will be readily apparent from the following description and the appended claim.

The process of this invention can be conducted in the presence or absence of a compound of the formula $R_3P$. While not to be limited to any particular reaction mechanism, it is believed the reducing agent essentially serves to reduce the substituted dihalonickel compound to a zero valent nickel compound. The added $R_3P$ compound then can serve as an electron donor to satisfy the coordination valence of the nickel.

Compounds of the formula $R_3P$ which can be used if desired include, for example, trimethylphosphine, triethylphosphine, triisopropylphosphine, tri-tert-butylphosphine, tri-n-decylphosphine, triphenylphosphine, trinaphthylphosphine, tribenzylphosphine, tri(4-phenylbutyl)-phosphine, tritolylphosphine, tri(4-butylphenyl)phosphine, and the like.

The oligomerization reaction of this invention is carried out by contacting one of butadiene, isoprene or piperylene with the catalyst system which forms on commingling bis(triphenylphosphine)dichloronickel and ethoxydiethylaluminum in the presence of a diluent. Suitable diluents include alkanes such as heptane and octane, cycloalkanes such as cyclohexane and methylcyclohexane, aromatic hydrocarbons such as benzene and toluene, ethers such as diethyl ether and tetrahydrofuran, and cyclic polyenes such as cyclooctadiene and cyclododecatriene. The reaction is carried out at a temperature in the range of from 25° to 150° C., preferably from 50° to 120° C. The catalyst ratio can vary depending upon the reducing reagent used. A practical upper limit of 20/1 reducing agent/substituted dihalonickel compound is satisfactory. It is convenient to employ some excess reducing agent over the minimum required to reduce the nickel compound, as the excess agent serves to remove water and other impurities.

The amount of added $R_3P$ compound can range from 0 to 20 mols per mol of substituted dihalonickel compound charged. As stated previously, the reaction does not require the addition of $R_3P$ compound, but it can be used depending upon the end product desired. If one desires higher yields of cyclododecatriene, no $R_3P$ compound should be added. On the other hand, if higher yields of dimer, particularly cyclooctadienes, are desired, $R_3P$ compound should be added as earlier defined.

The following examples serve to further illustrate the invention. The specific example describes a number of runs in which butadiene was converted to cyclic dimers and trimers according to the inventive process. However, the particular embodiments illustrated in the following runs are not to be considered limiting since other systems likewise are operative.

*Example I*

A series of runs was carried out in which 1,3-butadiene was converted to dimers and trimers according to the process of the invention. The results of these runs are expressed in Table I, wherein 4-vinylcyclohexene is denoted as VCH, 1,5-cyclooctadiene is shown as COD, and 1,5,9-cyclododecatriene is shown as CDT. Each of the runs was conducted using 125 grams of butadiene unless otherwise noted. The runs using an organoaluminum reducing agent were made using 25 ml. of dry benzene as diluent unless otherwise noted.

In a typical run, the following procedure was used. A mixture of 1.30 grams (2 millimols) of bis(triphenylphosphine)dichloronickel and 25 ml. of dry benzene was treated with 10 ml. of a 1.6 molar cyclohexane solution of ethoxydiethylaluminum. After 30 minutes, 124 grams of butadiene was introduced, and the autoclave containing the reaction mixture was heated. After 48 minutes, a temperature of 80° C. was attained, at which time the pressure was 195 p.s.i. An exothermic reaction occurred and the heaters were turned off. The temperature gradually reached 93° C. After 20 minutes, the pressure was constant, indicating no further reaction of the butadiene. The reaction mixture was then allowed to cool, after which it was treated first with methanol and then with dilute hydrochloric acid. The organic layer was then separated and dried over anhydrous calcium sulfate. After removing the solvent, distillation yielded 106 grams of colorless liquid boiling over the range 65° C. at 98 mm. to 95° C. at 3 mm. This liquid was analyzed by gas chromatography and found to contain 14 grams (11 weight percent) of 4-vinylcyclohexane, 57.7 grams (47 weight percent) of 1,5-cyclooctadiene and 32.4 grams (26 weight percent) of 1,5,9-cyclododecatriene. There was a 5.5 gram (4 weight percent) distillation residue. The total of the percentages shown is the total conversion of the butadiene charged to the reaction zone. This run, described in detail, is summarized in the first run shown in Table I.

TABLE I

| Substituted Dihalonickel Compound (A) Used | Millimols (A) Used | Reducing Agent (B) Used | Millimols (B) Used | Millimols Triphenylphosphine Added | Temp., °C. | Time, Minutes | Weight Percent of Butadiene Converted to— | | | |
|---|---|---|---|---|---|---|---|---|---|---|
| | | | | | | | VCH | COD | CDT | Non-volatiles |
| $[(C_6H_5)_3P]_2$ | 2 | $C_2H_5OAl(C_2H_5)_2$ | 16 | | 80 | 20 | 11 | 47 | 26 | 4 |
| $[(C_6H_5)_3P]_2$ | 2 | $C_2H_5OAl(C_2H_5)_2$ | 16 | | 60 | 180 | 11 | 56 | 21 | 3 |
| $[(C_6H_5)_3P]_2$ | 2 | $C_2H_5OAl(C_2H_5)_2$ | 16 | 10 | 80 | 25 | 14 | 54 | 11 | 3 |
| $[(C_6H_5)_3P]_2$ | 2 | $C_2H_5OAl(C_2H_5)_2$ | 16 | 10 | 60 | 150 | 18 | 63 | 7 | 3 |
| $[(C_6H_5)_3P]_2$ | 2 | $C_2H_5OAl(C_2H_5)_2$ | 16 | 40 | 80 | 90 | 22 | 68 | 2 | 4 |
| $[(C_6H_5)_3P]_2$ | 1 | $C_2H_5OAl(C_2H_5)_2$ | 16 | 5 | 80 | 90 | 13 | 64 | 13 | 3 |
| $[(C_6H_5)_3P]_2$[1] | 1 | $C_2H_5OAl(C_2H_5)_2$ | 16 | 5 | 80 | 30 | 8 | 51 | 11 | 3 |
| $[(C_6H_5)_3P]_2$ | 2 | $LiAlH_4$ | 30 | 10 | 80 | 300 | 6 | 28 | 8 | 5 |

[1] In this run, 75 cc. of benzene was used and only 83 grams of butadiene was charged.

The above data illustrate the formation of various oligomers of 1,3-butadiene and further illustrate that by addition of the $R_3P$ compounds, specifically triphenylphosphine, the percentage of dimer as compared with trimer produced is increased.

Reasonable modifications and variations are possible in view of the foregoing disclosure without departing from the spirit or scope thereof.

I claim:

A process for the oligomerization of 1,3-butadiene which comprises contacting said 1,3-butadiene with a catalyst which forms on commingling bis(triphenylphosphine)dichloronickel and ethoxydiethylaluminum in an organic diluent for about 60 to 100 minutes at a temperature in the range of 25 to 150° C. and subsequently recovering the oligomers of 1,3-butadiene as products of the process.

References Cited by the Examiner

UNITED STATES PATENTS 3,148,224  9/1964  Luttinger _____ 260—666

FOREIGN PATENTS 1,140,569  12/1962  Germany.

DELBERT E. GANTZ, *Primary Examiner.*

V. O'KEEFE, *Assistant Examiner.*